United States Patent [19]
Alleva et al.

[11] Patent Number: 5,794,197
[45] Date of Patent: Aug. 11, 1998

[54] SENONE TREE REPRESENTATION AND EVALUATION

[75] Inventors: Fileno A. Alleva; Xuedong Huang; Mei-Yuh Hwang, all of Redmond, Wash.

[73] Assignee: Micrsoft Corporation, Redmond, Wash.

[21] Appl. No.: 850,061

[22] Filed: May 2, 1997

Related U.S. Application Data

[63] Continuation of Ser. No. 185,479, Jan. 21, 1994, abandoned.

[51] Int. Cl.$^6$ .................................................. G10L 5/06
[52] U.S. Cl. ................................. 704/255; 704/249
[58] Field of Search ......................... 704/7, 9, 10, 242, 704/249, 250, 257, 256, 255

[56] References Cited

U.S. PATENT DOCUMENTS

| | | | |
|---|---|---|---|
| 4,783,803 | 11/1988 | Baker et al. | 381/42 |
| 4,817,156 | 3/1989 | Bahl et al. | 381/43 |
| 4,829,577 | 5/1989 | Kuroda et al. | 381/45 |
| 4,829,578 | 5/1989 | Roberts | 381/46 |
| 4,866,778 | 9/1989 | Baker | 381/43 |
| 5,027,406 | 6/1991 | Roberts et al. | 381/43 |
| 5,033,087 | 7/1991 | Bahl et al. | 395/2.65 |
| 5,054,074 | 10/1991 | Bakis | 381/41 |
| 5,440,663 | 8/1995 | Moese et al. | 395/2.64 |

OTHER PUBLICATIONS

Bahl et al., "Decision Trees for Phonological Rules in Continuous Speech," *IEEE International Conference on Acoustics, Speech, and Signal Processing*, 1991, pp. 185–188. Apr. 1991.

Hon et al., "CMU Robust Vocabulary–Independent Speech Recognition System," *IEEE International Conference on Acoustics, Speech, and Signal Processing*, 1991, pp. 889–892. Apr. 1991.

Takami and Sagayama, "A Successive State Splitting Algorithm for Efficient Allophone Modeling," *IEEE*, 1992, pp. I–573–576. Mar. 1992.

Hwang et al., "Predicting Unseen Triphones with Senones," paper delivered at DARPA Workshop on Speech Recognition, Jan. 20, 1993.

Hwang and Huang, Acoustic Classification of Phonetic Hidden Markov Models, in *Proceedings of 2nd European Conference on Speech and Communication and Technology* 2:785–788, Genova, Italy, Sep. 24–26, 1991.

Lee, "Context Dependent Phonetic Hidden Markov Models for Speaker–Independent Continuous Speech Recognition," *IEEE Transactions on Acoustics, Speech, And Signal Processing* 38(4):599–609, Apr. 4, 1990.

(List continued on next page.)

*Primary Examiner*—Richemond Dorvil
*Attorney, Agent, or Firm*—Seed and Berry LLP

[57] ABSTRACT

A speech recognition method provides improved modeling in recognition accuracy using hidden Markov models. During training, the method creates a senone tree for each state of each phoneme encountered in a data set of training words. All output distributions received for a selected state of a selected phoneme in the set of training words are clustered together in a root node of a senone tree. Each node of the tree beginning with the root node is divided into two nodes by asking linguistic questions regarding the phonemes immediately to the left and right of a central phoneme of a triphone. At a predetermined point, the tree creation stops, resulting in leaves representing clustered output distributions known as senones. The senone trees allow all possible triphones to be mapped into a sequence of senones simply by traversing the senone trees associated with the central phoneme of the triphone. As a result, unseen triphones not encountered in the training data can be modeled with senones created using the triphones actually found in the training data.

30 Claims, 7 Drawing Sheets

OTHER PUBLICATIONS

Improved Vocabulary–Independent Sub–Word HMM Modeling Wood et al. ICASSP '91. 1991 International Conf. on Acoustics. . . . /14–17 May 91. pp. 181–184.

Hwang et al.. "Subphonetic Modeling With Markov States–Senone" ICASSP 92. 1992 International Conf. on Acoustics. . . . /23–26 Mar. 92. pp. I–33 to I–36.

Hwang et al., Predicting Unseen Triphones with senones ICASSP 93. 1993 International Conf. on Acoustics. . . . /27–30 Apr. 9. pp. II–311 to II314.

SENONE TREE REPRESENTATION AND EVALUATION

CROSS-REFERENCE TO RELATED APPLICATION

This application is a continuation of U.S. patent application Ser. No. 08/185,479, filed Jan. 21, 1994, now abandoned.

TECHNICAL FIELD

The present invention relates to computer speech recognition and in particular to computer speech recognition employing hidden Markov models with senone trees.

BACKGROUND OF THE INVENTION

There has long been a desire to have machines capable of responding to human speech, such as machines capable of obeying human commands and machines capable of transcribing dictation. Such machines would greatly increase the speed and ease with which humans communicate with computers and the speed and ease with which humans record and organize their own words and thoughts.

Most present speech recognition systems operate by matching an acoustic description of words in their vocabulary against an acoustic description of a speech utterance to be recognized. In many such systems, the acoustic signal generated by the utterance to be recognized is converted by an analog/digital (A/D) converter into a digital representation of the successive amplitudes of the audio signal created by the utterance. The digital signal is converted into a frequency domain signal which includes a sequence of frames, each of which gives the amplitude of the audio signal in each of a plurality of frequency bands. Such systems commonly operate by comparing the sequence of frames produced by the utterance to be recognized with a sequence of nodes, or frame models, contained in the acoustic model of each word in their vocabulary.

Originally, the performance of such frame matching systems was poor, because the sounds of a given word are rarely, if ever, spoken in exactly the same speed or manner. However, a technique known as Hidden Markov Modeling has been developed which greatly improves the performance of such systems. Hidden Markov Modeling determines the probability that a given frame of an utterance corresponds to a given node in an acoustic word model. It does this not only as a function of how closely the amplitudes of the frames individual frequency bands for a frame match the expected frequencies of the given node, but also as a function of how the deviation between the actual and expected amplitudes compares to the expected deviations for such values. Such probabilistic matching provides a much greater ability to deal with the variations that occur in different utterances of the same word, and a much greater ability to deal with the noise commonly present during speech recognition tasks.

In a speech recognition system using hidden Markov models, a Markov model is established for each word or sub-word, such as a phoneme. Generally, for each Markov model, a plurality of states and transitions between the states are defined. A state in a hidden Markov model describes a very short acoustic event, usually one to a few time frames (each time frame typically is about 10 milliseconds). Unknown speech is converted into a label string and a probability of each word Markov model outputting the label string is determined based on transition probabilities and label output probabilities assigned to each respective Markov model. The Markov model having the highest probability of producing the label string is determined. In speech recognition using Markov models, the transition probabilities and the label output probabilities can be estimated statistically based upon numerous training words spoken into the computer.

A major problem in speech recognition is that of reducing the tremendous amount of computation it requires, so that recognition can be performed in a reasonable time on relatively inexpensive computer hardware. Because many speech recognition systems operate by comparing a given spoken utterance against each word in its vocabulary, and each such comparison can require thousands of computer instructions, the amount of computation required to recognize an utterance tends to grow as does the vocabulary. Thus, the problem of making speech recognition computationally efficient is made even more difficult in systems designed to recognize the large vocabularies necessary to make speech recognition useful for the transcription of normal language.

Researchers in the art found that improved speech recognition accuracy can be obtained by modeling on a subword level using basic acoustic units known as phonemes. A phoneme is the smallest unit of speech that distinguishes one utterance from another. For example, the word "dog" is spoken using three phonemes corresponding to the three "d", "o", and "g" sounds that make up the spoken word.

It is well-known in the art that a given phoneme may be pronounced slightly differently depending upon the context of the phoneme within a word. As a result, those skilled in the art have obtained improved recognition accuracy by modeling triphones. Triphone modeling involves modeling a phoneme in the context of the phonemes immediately to the left and right of the phoneme in question.

The inventors of the present invention have previously developed a system known as the shared distribution model (SDM). The SDM analyzes all of the output distributions produced for states of the phonemes spoken during training. The SDM groups similar output distributions together, with the clustered output distributions being known as senones. The SDM considers virtually all possible configurations for permitting output distributions to move from one cluster to another. Consequently, the computational complexity is an exponential function of the number of objects being clustered, which is the number of triphones times the number of output distributions per triphone model. Typically, the number of triphones found in a large vocabulary is on the order of 50,000 triphones with 3–5 output distributions per triphone model.

A major problem with the SDM is its inability to model triphones not encountered in the training data, i.e., unseen triphones. Given that any output distribution can be clustered with any other output distribution during training, there is no way to determine to which senones the states of an unseen triphone belong. One way to overcome such a limitation would be to ensure that all possible triphones are found during training. However, training can be a very time consuming and expensive ordeal so as to make it virtually impossible or at least impractical to train all triphones that may be encountered. Another way around this problem is to use context independent monophone models to model the unseen triphones. However, monophone models are not as detailed as triphones since they lose information on the left and/or right phoneme context.

SUMMARY OF THE INVENTION

It is an object of the invention to provide an improved speech recognition method using hidden Markov modeling.

It is another object of the invention to provide a method for modeling unseen triphones not encountered in a set of training words.

These and other objects of the invention are satisfied by a speech recognition method that provides improved modeling and recognition accuracy using hidden Markov models. During training, the method creates a senone tree for each state of each phoneme. The method receives a data set of output distributions for the training words, each output distribution being associated with one of a predetermined number of states of a triphone of one of the training words. All output distributions received for a selected state of a selected triphone in the training words are gathered in a root node of a senone tree. Each node of the tree beginning with the root node is divided into two nodes by asking linguistic questions regarding the phonemes immediately to the left and right of the central phoneme of the triphone. The linguistic question used for each node is determined by an entropy calculation of the entropy decrease resulting by splitting the node into two children nodes using the linguistic question. At a predetermined point, the tree creation stops, resulting in leaves representing clustered output distributions known as senones. The senone trees allow all possible triphones to be mapped into one or more senones simply by traversing the related senone trees associated with the central phoneme of the triphone. As a result, unseen triphones not encountered in the training data can be modeled with senones created using the triphones actually found in the training data.

In a preferred embodiment, the linguistic question associated with each node is a composite question formed by combining the plurality of simple questions. To construct the composite question of a node, a simple tree is grown using simple linguistic questions, thereby resulting in a plurality of leaf nodes. Then, the leaf nodes are combined into two clusters which yield a minimum total entropy. The simple questions giving rise to the leaf nodes of a selected one of the clusters are combined to form the composite question for the selected node.

DETAILED DESCRIPTION OF THE INVENTION

The present invention is shown for purposes of illustration embodied in a speech recognition method that provides improved modeling and recognition accuracy using hidden Markov models (HMM). During training, the method creates a senone tree for each state of each phoneme encountered in a data set of training words. All output distributions received for a selected state of a selected phoneme in the data set of training words are grouped in a root node of each senone tree. Each node of the tree beginning with the root node is divided into two nodes by asking linguistic questions regarding the phonemes immediately to the left and right of a central phoneme of a triphone. At a predetermined point the tree creation stops, resulting in leaves representing clustered output distributions known as senones. The senone trees allow all possible triphones to be mapped into one or more senones simply by traversing the senone trees associated with the central phoneme of the triphone. As a result, unseen triphones not encountered in the training data can be modeled with senones created using the triphones actually found in the training data.

Figure 1:
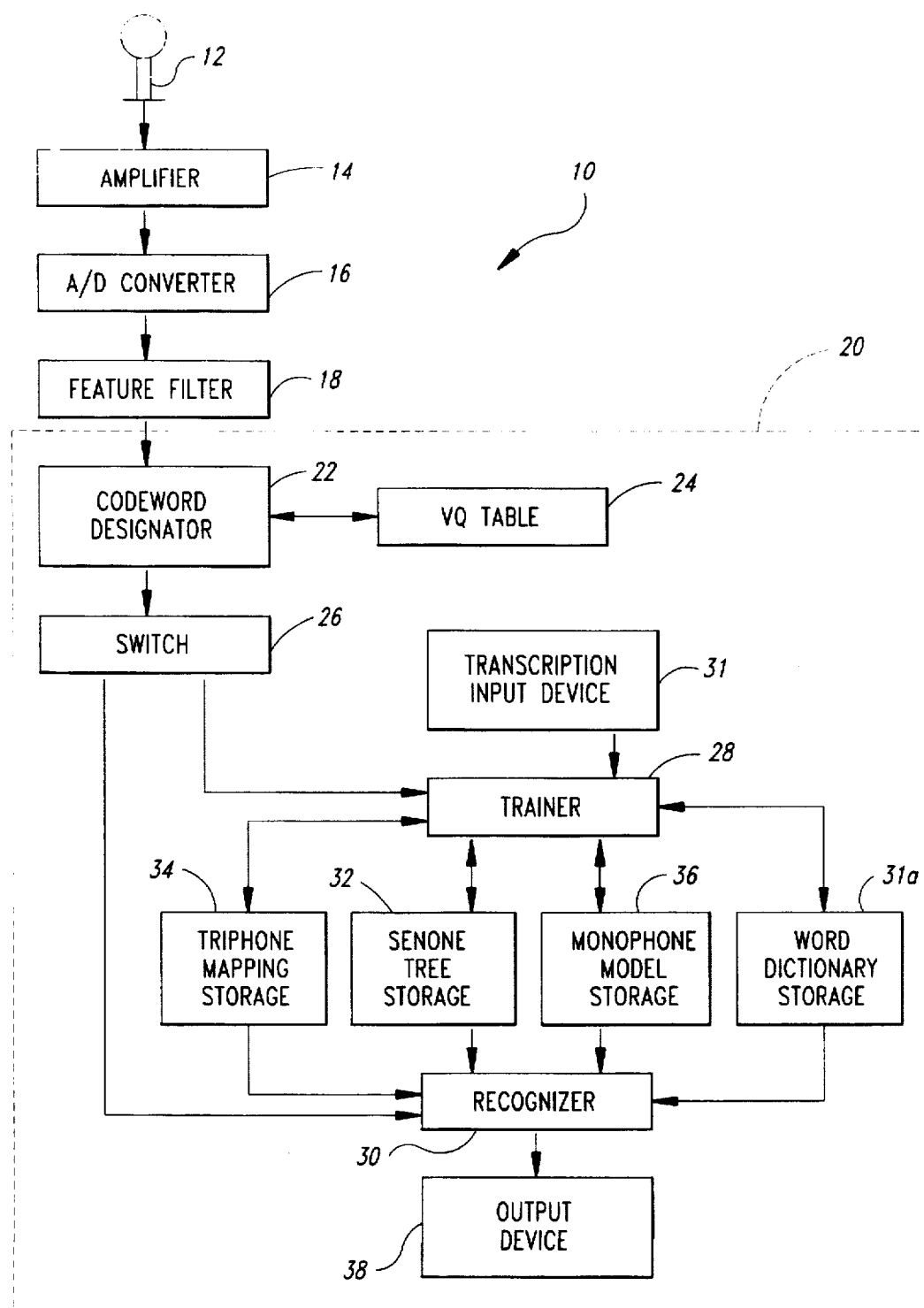
FIG. 1 is a block diagram of a speech recognition system employed in the present invention.

A speech recognition system 10 is shown in FIG. 1 that models speech training data based on hidden Markov models and recognizes new speech using the hidden Markov models. An utterance spoken into a microphone 12 is amplified by an amplifier 14 and passed to an audio/digital (A/D) converter 16. The A/D converter 16 transforms the analog speech signal into a sequence of digital samples, which is supplied to a feature filter 18. The feature filter 18 is a conventional array processor that performs spectral analysis to compute a magnitude value for each frequency band of a frequency spectrum. Known methods of spectral analysis include fast Fourier transforms, linear predictive coding, and other acoustic parameterizations such as cepstral coefficients. Preferably this spectral analysis is performed every 10 milliseconds such that each spoken word is made up of many 10 millisecond time frames with a frequency spectrum for each frame.

The frequency spectrum of each frame is transmitted to a data processor 20 that can be any conventional computer such as a desk-top personal computer. The data processor 20 includes a codeword designator 22 that receives each frame and compares the frame to numerous acoustic feature prototypes represented by codewords in a vector quantization (VQ) Table 24. In a preferred embodiment, there are 256 codewords in the VQ Table 24 that are chosen to adequately cover the entire human speaking range. Each codeword is a vector that includes average values for approximately 128 frequency bands. The codeword that most closely matches the frequency spectrum distribution of an input frame becomes associated with that frame. As such, the codeword designator 22 outputs a string of codewords for each spoken utterance with an interval of 10 milliseconds between consecutive codewords. The codeword string is transmitted via a switch 26 to either a trainer 28 or a recognizer 30.

The trainer 28 also receives a phonetic transcription of each training word from a user via a transcription input device 31 such as a computer keyboard. Each phonetic transcription is stored in a word dictionary storage 31A. The trainer 28 calculates a hidden Markov model for each triphone using the codeword string and the phonetic transcription. Each word is then defined by a sequence of triphones. The recognizer 30 uses the hidden Markov models to recognize subsequent occurrences of the same word. The trainer constructs a senone tree for each state of each phoneme encountered in the training words and stores the senone trees in a senone tree storage 32. The trainer uses the senone tree storage to map triphones to the senones resulting from the senone tree creation and stores the triphone mapping in a triphone mapping table 34. The trainer creates a monophone model for each phoneme encountered in the training words according to any well-known method, such as the Forward/Backward Algorithm. The trainer stores the monophone models in a monophone model table 36. The recognizer 30 uses the monophone models, triphone models, and triphone mappings to recognize a spoken utterance. Upon recognizing the spoken utterance, the recognizer passes the recognized word to an output device 38 that displays the recognized word to a user.

Figure 2:
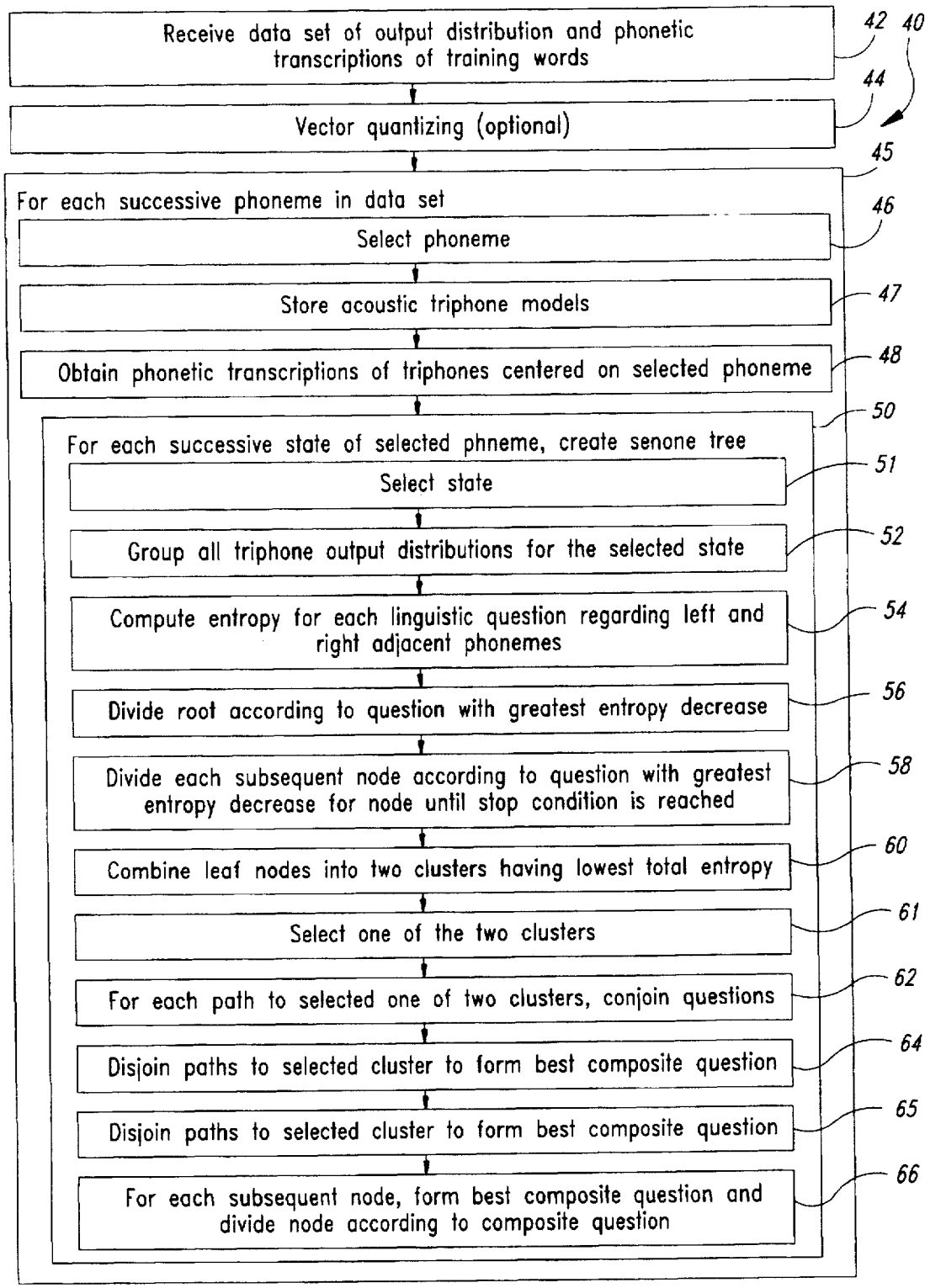
FIG. 2 is a flow diagram of a senone training method used in the system of FIG. 1.

A preferred embodiment is shown in FIG. 2 of a training method 40 employed by the trainer 28 to create one decision tree for each Markov state of each phoneme. In step 42, the trainer 28 receives a data set of output distributions and phonetic transcriptions of training words. The data set can be received one word at a time from the microphone, or a previously produced data set can be input in its entirety via a conventional computer input device, such as a floppy disk drive.

It should be understood that a vector quantization step 44 may optionally be used in the formation of tokens representing the utterance. That is, some successful speech recognition systems use vector quantization to compress the data required to represent the spectral information produced by the feature filter 46 for each frame. The present invention can work well with or without the vector quantization step. As is well known to those skilled in the art, the vector quantization step 44 involves matching the frequency spectrum for each frame against a code book of sample spectra. The frequency spectrum is then replaced by a single number, namely a codeword or an index into the code book of the best matching sample spectrum.

In the present invention the training method 40 attempts to model each triphone found in the training data set by performing step 45 for each successive phoneme. Step 45 begins with substep 46 which selects a phoneme. In substep 47 the trainer 28 calculates and stores acoustic triphone models for the selected phoneme. Such creation of each triphone model for the selected phoneme is well known in the art and is based upon transition and output frequencies calculated for the triphone. The triphone model includes an output probability distribution for each state.

Continuing with the substeps of step 45, the trainer 28 obtains phonetic transcriptions of all triphones centered on the selected phoneme in substep 48. In substep 50, the trainer creates a senone tree for each successive state of the selected phoneme. To create the senone tree, one of the states of the selected phoneme is selected in substep 51 and all output distributions for the selected state of the selected phoneme are grouped into a root node in substep 52. The root is represented by an output distribution whose count entries are equal to the summations of the count entries in all the involved distributions. Creation of the senone tree involves successively dividing the group of output distributions in the root node into numerous leaf nodes representing clusters of similar output distributions, the clusters being known as senones.

As is well known in the art, the English language has approximately 50 phonemes that can be used to define all parts of each English word. In a preferred embodiment of the present invention, each phoneme Markov model includes five states, so there are 250 senone trees in total. A senone tree is a binary tree that is grown by splitting a root node and each of a succession of nodes with a composite linguistic question associated with each node, each question asking about the category of the left or right phoneme context of a triphone. The simple linguistic questions composing the composite questions are generated by an expert linguist and are designed to capture linguistic classes of contextual effects. An example of a set of 46 linguistic questions can be found in an article by Hon and Lee entitled "CMU Robust Vocabulatory—Independent Speech Recognition System," IEEE International Conference on Acoustics, Speech and Signal Processing, Toronto, Canada, 1991, pages 889–892, which is incorporated herein by reference.

In order to split the root node or any subsequent node the trainer 28 must determine which of the numerous linguistic questions is the best question for the node. In a preferred embodiment, the best question is determined to be the question that gives the greatest entropy decrease between the parent node and the children nodes. To elaborate, the entropy decrease obtained by splitting a node is computed as the weighted sum of entropy decreases from all state pairs between the parent node $(T_1+T_2)$ and the child nodes $(T_1, T_2)$. The following Equation 1 is used in the preferred embodiment to compute the entropy decrease:

$$\sum_i W_i^i \{(C_{T_1}^i + C_{T_2}^i) H_{T_1+T_2}^i - C_{T_1}^i H_{T_1}^i - C_{T_2}^i H_{T_2}^i\} \quad (1)$$

In Equation 1, the superscript i denotes each Markov state number, the subscript k denotes the Markov state number of the senone tree being built. In addition, the function H refers to the information entropy of each output distribution and is equal to the summation of each probability ($P_x$) of the output distribution multiplied by the inverse of the log of $P_x$. The following equation 2 computes the information entropy, where x equals the number of entries in the output distribution:

$$-\sum_x P_x \log P_x \quad (2)$$

The parameter C is an occurrence count which is equal to the summation of the count entries in $P_x$. The parameter W is the state dependent weight ratio, which depends on the distance between k and i. That is, a state closer in time to the state for which the tree is being constructed has a higher weight given that its closeness to the selected state allows it to have a stronger influence on the sound produced for the selected state. In a preferred embodiment, the weight ratio W is represented by the following Table 1:

TABLE 1

| k − i | 0 | 1 | 2 | 3 | 4 |
| --- | --- | --- | --- | --- | --- |
| Wj*R | 1.0 | 0.3 | 0.15 | 0.10 | 0.01 |

The value R ensures that the sum of all the weights for a given state k sum to 1, so R=1.56 for k=1 or 5, R=1.85 for k=2 or 4, and R=1.90 when k=3.

Using the entropies computed in step 54 of FIG. 2, in step 56 the training method 40 divides the root node according to whichever question yields the greatest entropy decrease. All linguistic questions are yes or no questions, so two children nodes result from the division of the root node. In step 58, each subsequent node is divided according to whichever question yields the greatest entropy decrease for the node. The division of nodes stops according to predetermined considerations. Such considerations may include when the number of output distributions in a node falls below a predetermined threshold or when the entropy decrease resulting from a division falls below another threshold. When the predetermined stop consideration is reached, the leaf nodes represent clustered output distributions or senones.

The result of steps 52 through 58 is a simple tree extending from the root node to numerous leaf nodes. However, given that each node of the simple tree was split using a single linguistic question for each node, a data fragmentation problem results in which similar triphones are represented in different leaf nodes. To alleviate the data fragmentation problem more complex questions are needed. Such complex questions can be created by forming composite questions based upon combinations of the simple linguistic questions.

To form a composite question for the root node, in step 60 all of the leaf nodes are combined into two clusters according to whichever combination results in the lowest total entropy as computed by Equation 3:

$$\sum_i W_k^i \, |C_x^j H_x^j + C_y^j H_y^j| \quad (3)$$

where X and Y represent the two clusters.

In step 61, one of the two clusters is selected, based preferably on whichever cluster includes fewer leaf nodes in order to obtain a compact representation of the composite question. In step 62, for each path to the selected cluster, the questions producing the path in the simple tree are conjoined. In step 64, all of the paths to the selected cluster are disjoined to form the best composite question for the root node. In step 65, the root is divided according to the found composite question. In step 66, a best composite question is formed for each subsequent node according to the steps of steps 54 through 64. Each best composite question is used to divide each subsequent node.

Figure 3:
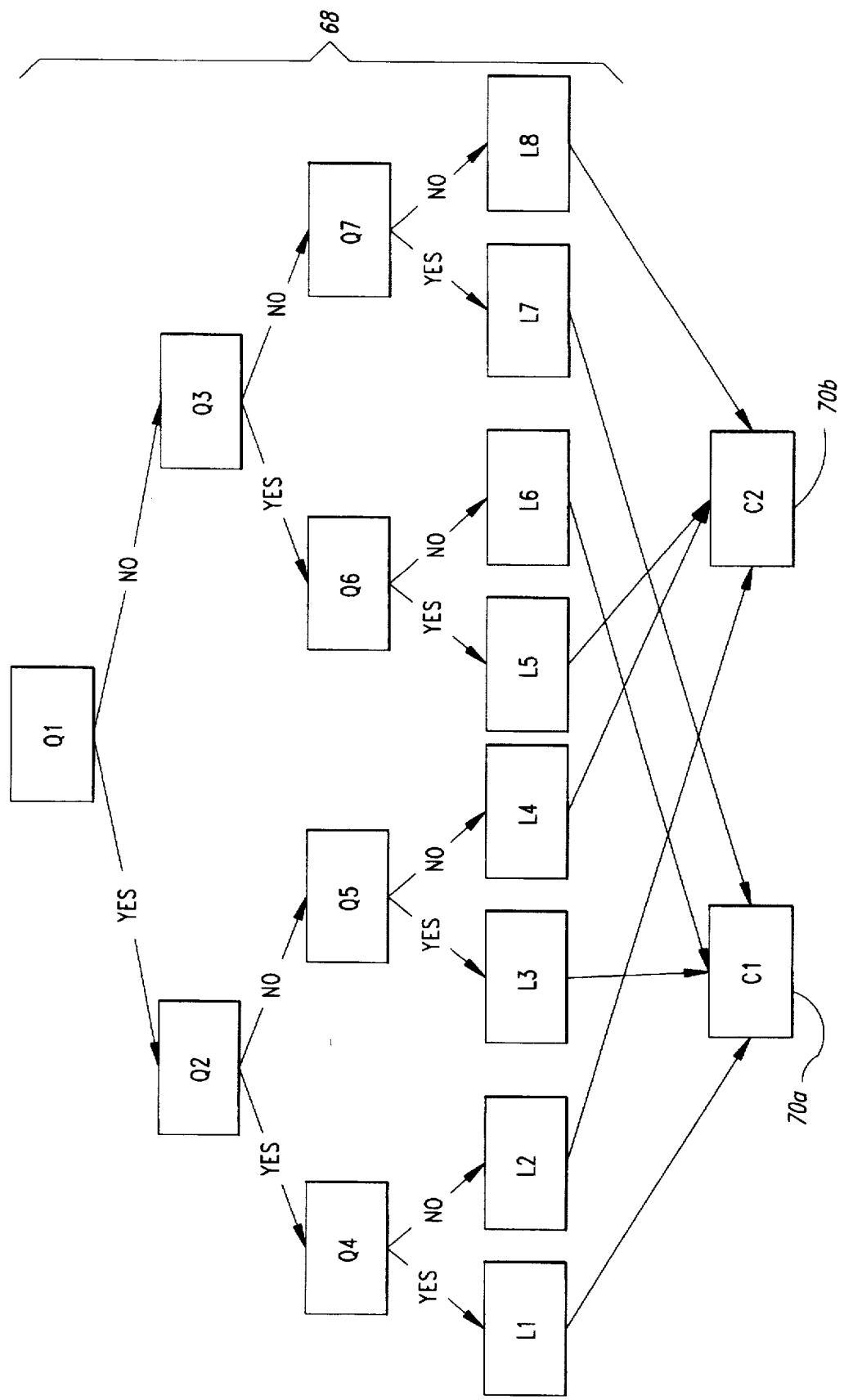
FIG. 3 is an example of a senone tree produced according to the flow diagram of FIG. 2.

An example may help in understanding the formation of composite questions. A simple tree 68 is shown in FIG. 3 which includes leaf nodes L1 through L8. Based on the results of calculating the lowest entropy according to Equation 3 in step 60, assume that cluster 70A is formed from leaf nodes L1, L3, L6 and L7 and cluster 70B is formed from leaf nodes L2, L4, L5 and L8. Given that there are an equal number of leaf nodes in each of the clusters 70A and 70B, it is not significant which of the clusters is chosen as the selected cluster. Assuming cluster 70A is selected, step 62 conjoins the questions used to obtain each of the leaves L1, L3, L6 and L7 in cluster 70A. For leaf node L1, the questions in its path are Q1, Q2 and Q4. Similarly, for leaf node L3, the appropriate questions are Q1, Q2 and Q5; leaf L6 is created from Q1, Q3 and a negative answer to Q6; and leaf node L7 is created from positive answers to Q1, Q3 and Q7. In step 64, each of the paths represented by the conjoined questions are disjoined to form the best composite question: Q1Q2Q4+Q1Q2Q5+Q1Q3Q6+Q1Q3Q7 (the underline signifies a negative answer).

After a senone tree is created for each state of each phoneme, a senonic mapping of each triphone to be recognized needs to be created. Each senonic mapping involves determining the appropriate senone for each state in the triphone. As a result, each triphone will be mapped to a sequence of senones as determined by traversing the senone trees.

Figure 4:
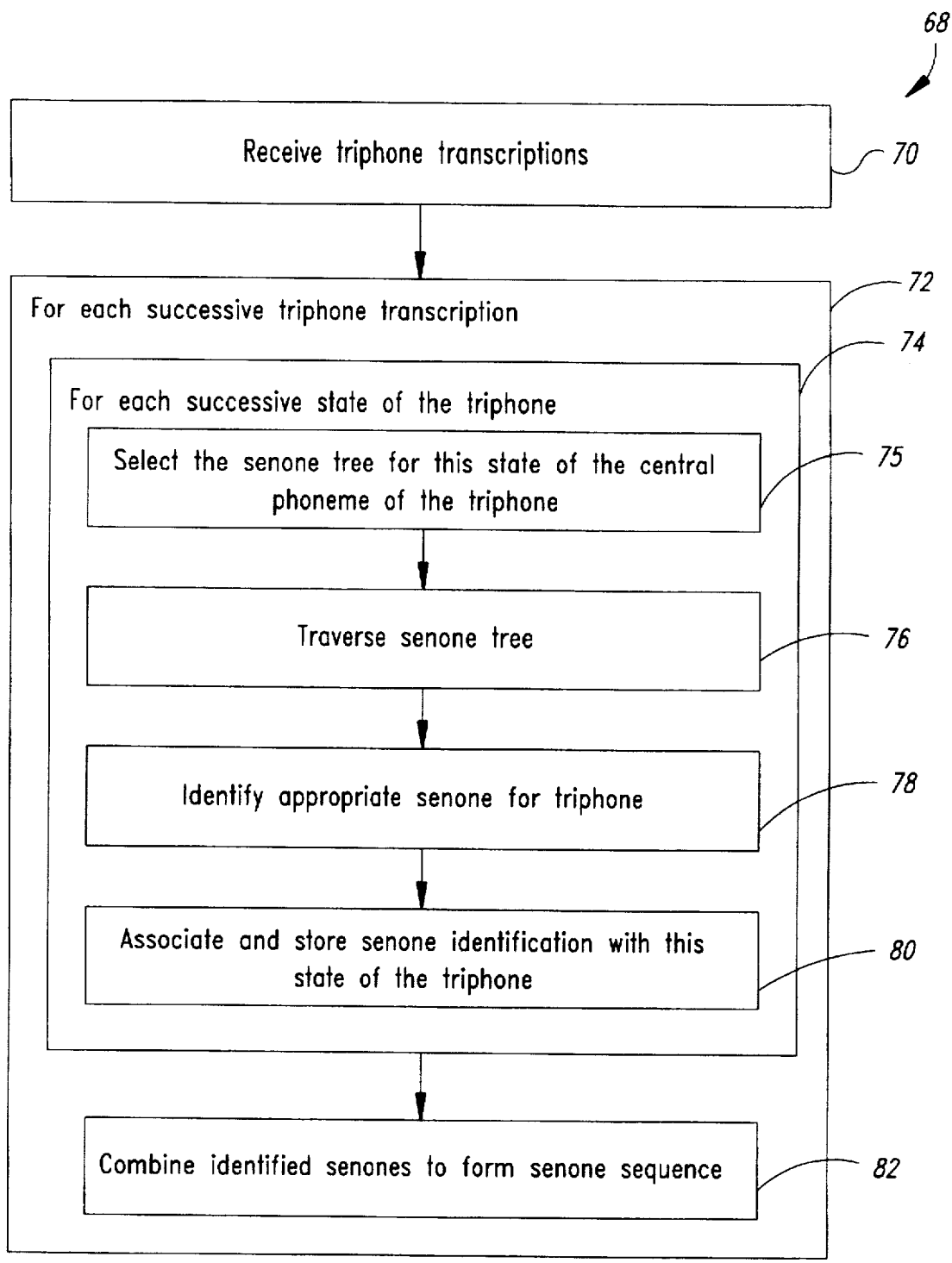
FIG. 4 is a flow diagram of a triphone modeling method used in the system of FIG. 1.

A senonic mapping method 68 is shown in FIG. 4 that is used in the preferred embodiment to map each triphone. In step 70, the trainer 28 receives phonetic transcriptions of all triphones from the user via the transcription input device 31. The phonetic triphone transcriptions are received as part of the phonetic transcriptions of words to be recognized. In step 72, a senone sequence is created for each successive triphone transcription received in step 70.

Step 72 begins with substep 74, which determines the appropriate senone for each state of the triphone. Substep 74 begins with substeps 75 and 76, which select and traverse the senone tree corresponding to each state of the central phoneme of the triphone. The senone tree is traversed simply by answering the linguistic questions associated with the nodes of the senone tree until a leaf is reached. In substep 78, the appropriate senone is identified for the state of the triphone. In substep 80, the identified senone is associated with the state of the triphone. After an appropriate senone is identified for each successive state of the triphone, the identified senones are combined to form a senone sequence in substep 82.

Figure 5:
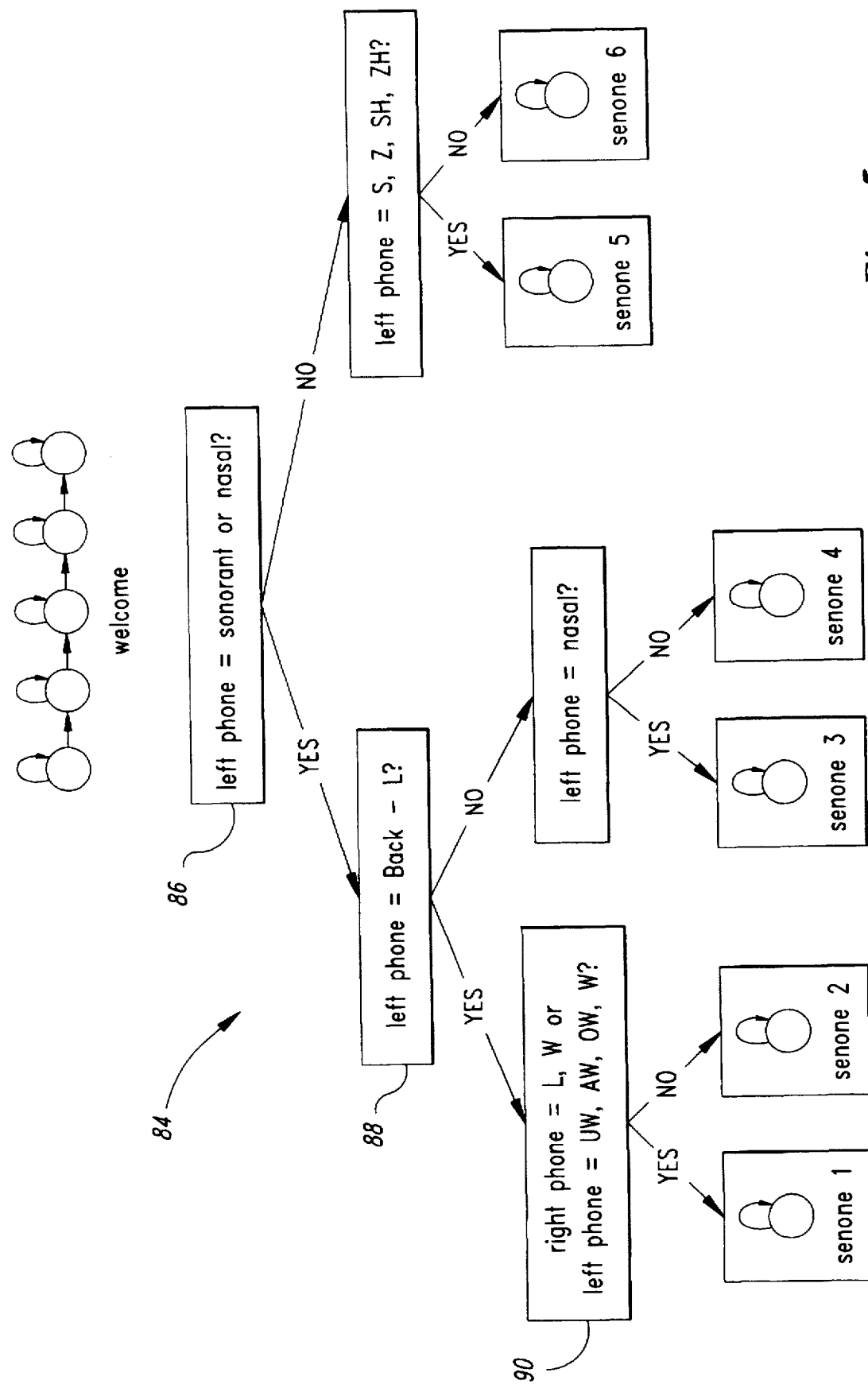
FIG. 5 is a first example of a senone tree produced according to the flow diagram shown of FIG. 2.
Figure 6:
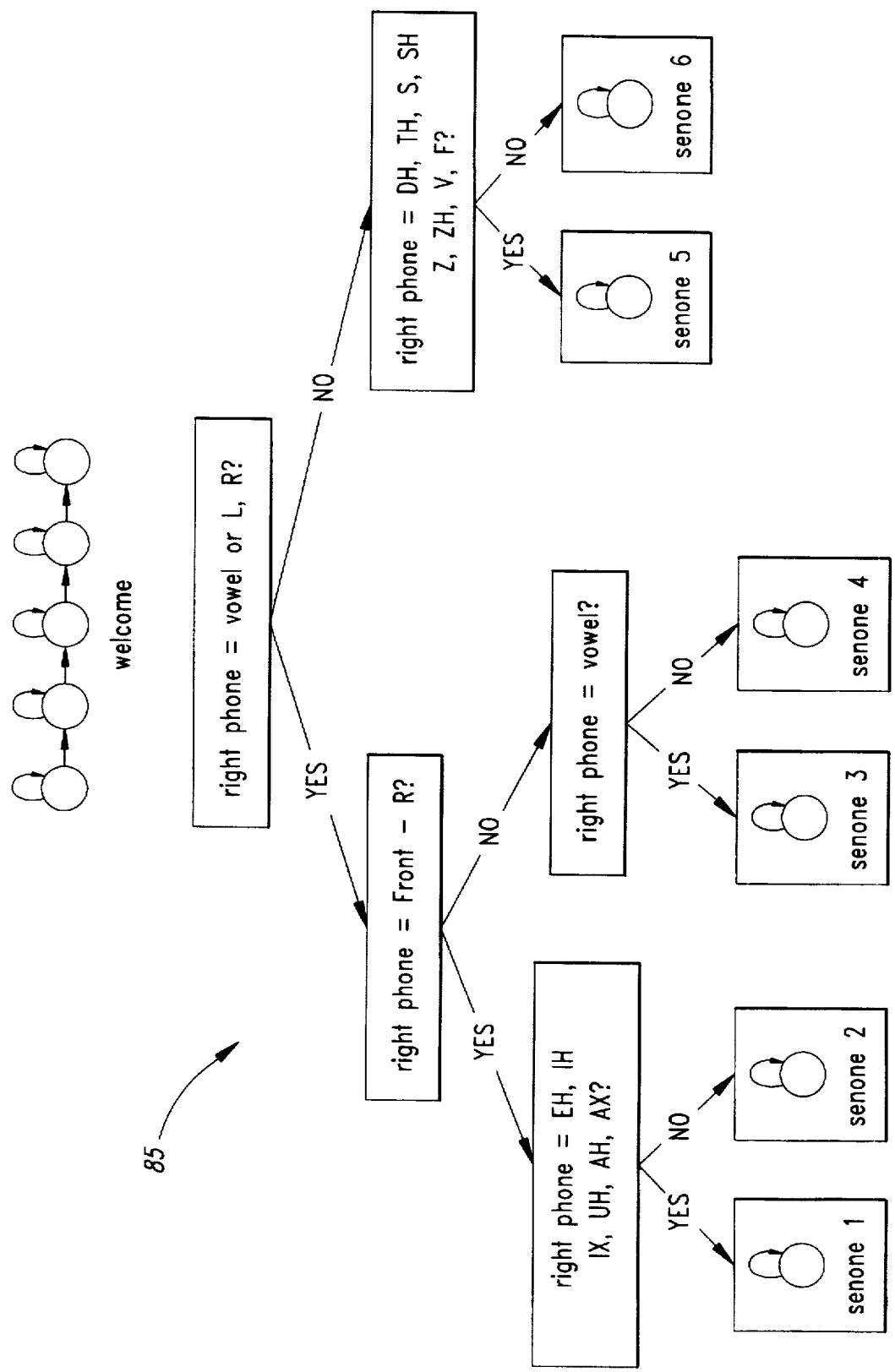
FIG. 6 is a second example of a senone tree produced according to the flow diagram shown of FIG. 2.

An example may be helpful in understanding how a senone tree is traversed. Senone trees are shown in FIGS. 5 and 6 for the phoneme /K/ for the spoken sound of the letter "c" as part of the word "welcome." FIG. 5 shows the senone tree for the first state of the /K/ phoneme while FIG. 6 shows the senone tree for the fifth state of the /K/ phoneme. It will be appreciated that many of the questions in the senone trees shown in FIGS. 5 and 6 are composite questions formed according to step 60 through 64 of FIG. 2.

To determine the appropriate senone sequence for the triphone /L,K,AX/ for the letter "c" of the word "welcome," each of the five senone trees of the /K/ phoneme must be traversed. Referring to the first state senone tree 84 shown in FIG. 5, the question in the root node 86 is whether the left phoneme is a sonorant or a nasal. Since the /L/ phoneme is a sonorant, the tree traversal moves to child node 88 corresponding to the Yes branch of the root node 86. Node 88 asks whether the left phoneme (/L/) is a back phoneme, i.e., is the left phoneme a phoneme that is spoken with the tongue positioned toward the back of the mouth. The /L/ phoneme is a back phoneme, so the traversal proceeds through the Yes branch to node 90. Given that the /AX/ phoneme of the triphone is not an L or a W and the /L/ phoneme is not any of the phonemes specified in the question in node 90, the traversal proceeds through the No branch of node 90. At the No branch of node 90 is senone 2, which is identified as the appropriate senone for the first state of the /L,K,AX/ triphone. A similar tree traversal proceeds for each of the other states of the /K/ phoneme, including the senone tree for the fifth state shown in FIG. 6.

With senone trees, all Markov states of all triphone models, either seen or unseen in training data, traverse the corresponding senone tree until a leaf is reached, where a senone is represented. A comparison of FIGS. 5 and 6 shows that although the same global information in Equation 1 is used for both trees, the appropriate questions determined for each node are different for each tree. The differences arise because of the differing weight ratios $W_k^i$ in Equation 1 used to compute the entropy for each question.

Figure 7:
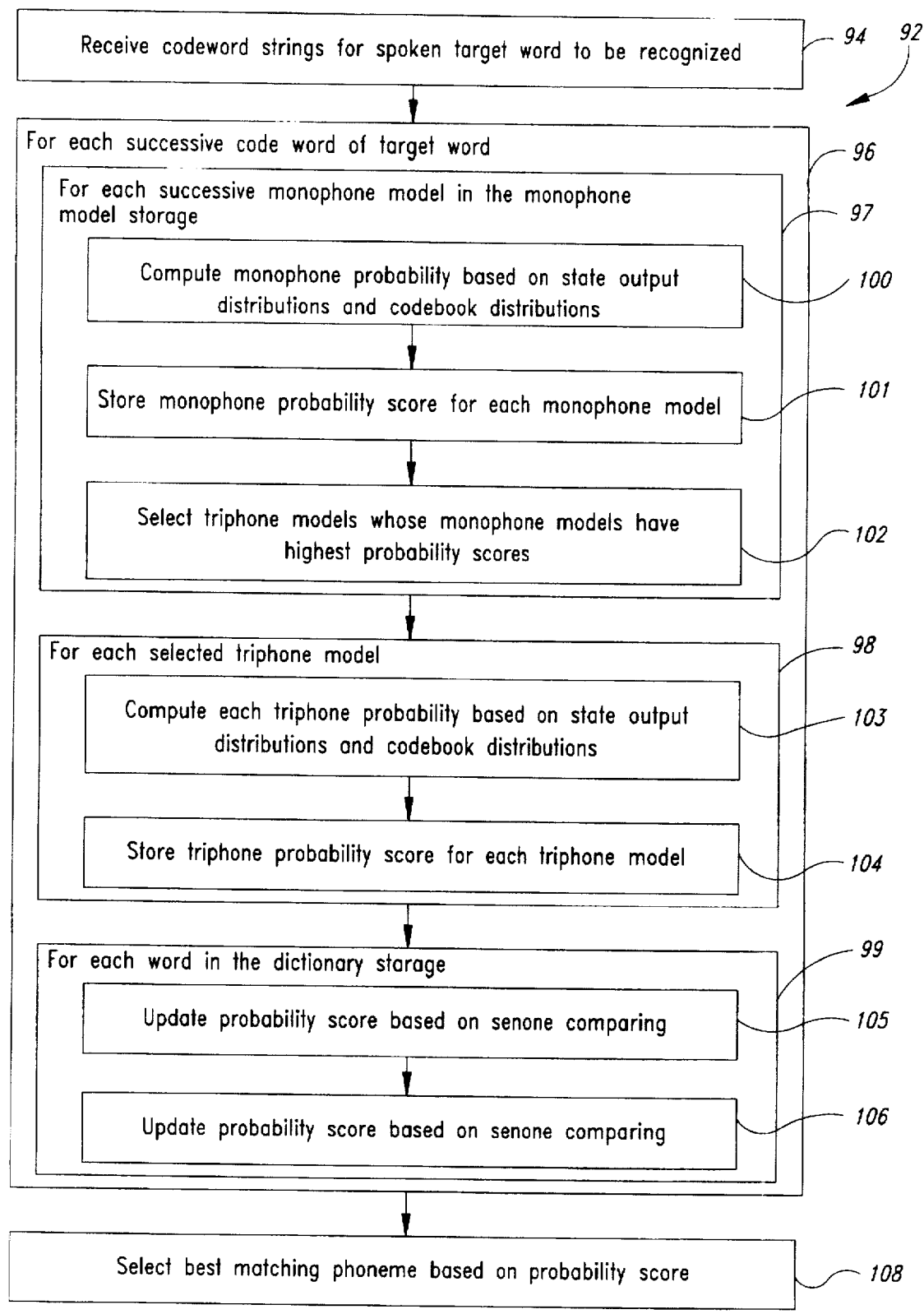
FIG. 7 is a flow diagram of a word recognition method used in the system of FIG. 1.

After a senone sequence is defined for each triphone, the recognizer 30 is ready to recognize spoken words. FIG. 7 shows a flow diagram of a recognition method 92 that recognizes spoken words. In step 94, the recognizer receives codeword strings for a spoken target word to be recognized via the switch 26. In step 96, for each successive codeword of the input code string the method performs steps 97, 98 and 99. In step 97, for each monophone in the monophone model storage 36, the method performs steps 100, 101, 102. In step 100 the method computes the monophone probability according to any number of methods known to those skilled in the art, such as Semi-Continuous Hidden Markov Modeling (SCHMM). In step 101, the recognizer stores a probability score for each monophone model. In step 102, the method selects a predetermined number of triphone models whose monophone models have the highest probabilities.

In step 98, the method performs steps 103 and 104 for each most likely triphone model. In step 103, the method computes a senone probability score according to a well-known method, such as SCHMM. In step 104, the recognizer stores a probability score for each senone.

In step 99, the method performs steps 105 and 106. For each word in the dictionary, the method obtains its triphone transcription from the word dictionary storage 31A (FIG. 1). In step 106, a word probability for the word is updated using the stored senone scores computed in step 98 for the selected triphone models and the stored monophone scores computed in step 97 for the unselected triphone models having monophone models that were not among the most likely computed step 98. In step 108, the recognizer 30 selects as the best modeling word, the word having the highest word probability and outputs the word of the output device 38 as the recognized word.

By performing a context independent monophone model matching before performing senone matching, the recognition method of the present invention limits the number of senone comparisons that need to be performed. Given that there are 50 phonemes in the English language and five states per phoneme in the preferred embodiment, there will be 250 monophone model comparisons. In addition, in the preferred embodiment there are approximately 100 senones per phoneme model. As such, if the monophone model comparison produces three best matching phonemes, then only 300 senone comparisons need to be made rather than the 5,000 comparisons that would need to be made if the senones for all 50 phonemes needed to be checked.

As will be appreciated from the foregoing discussion, the present invention includes a speech recognition method that provides improved modeling and recognition accuracy using hidden Markov models. The method provides both context independent monophone models and context dependent triphone models for each phoneme in a vocabulary. Triphone modeling is accomplished by creating a senone decision tree for each state of each phoneme. Each senone tree is created by grouping all output distributions received for a selected state of a selected phoneme in an input set of training words into a root node of the senone tree. Each node of the senone tree beginning with the root node is divided into two nodes by asking linguistic questions regarding the phonemes immediately to the left and right of the phoneme. At a predetermined point, the tree creation stops, resulting in leaves representing clustered output distributions known as senones. Senone trees allow unseen triphones not encountered in the training data to be modeled into a sequence of senones by traversing the senone trees associated with the central phoneme of the triphone. During recognition, the monophone models and the senone sequences are both used to recognize a spoken utterance. The invention uses the monophone models to limit the number of senone comparisons that need to be performed, thereby resulting in a quick and efficient recognition of the spoken utterance.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

We claim:

1. A method of performing speech recognition using a vocabulary of words characterized by one or more triphones for each word, each triphone including a central phoneme, a left phoneme immediately preceding the central phoneme, and a right phoneme immediately following the central phoneme, the method comprising:

receiving a data set of output distributions based on a set of training words spoken by training users, each output distribution being associated with one of a predetermined number of states of a triphone encountered in one of one of the training words; and creating a plurality of senone trees for each successive phoneme of the vocabulary by:

selecting the phoneme;

for each successive state of the selected phoneme:

selecting the state;

creating a senone tree for the selected state of the selected phoneme, the tree having a plurality of levels with one or more nodes at each level, the senone tree being created by:

grouping together in a root node all received output distributions associated with the selected state of triphones that include the selected phoneme as their central phoneme; and dividing each node into a plurality of nodes according to linguistic questions regarding the left and right phonemes of the triphones associated with the output distributions that are grouped in the root node such that each node represents a group of similar output distributions, and continuing the dividing of each node until a stop condition is met at which the nodes are leaf nodes associated with one or more output distributions.

2. The method according to claim 1 wherein each leaf node is associated with a plurality of output distributions, the method further comprising:

creating a senone for each leaf node by combining the output distributions for the leaf node;

receiving a phonetic transcription of an unseen triphone not found in the set of training words, the unseen triphone including a central phoneme together with phonemes positioned immediately adjacent the central phoneme;

traversing the senone trees of the states of the central phoneme in the unseen triphone; and determining which senone of each senone tree traversed is appropriate for the unseen triphone based on the phonemes positioned immediately adjacent the identified phoneme, the senones forming a senonic mapping of the unseen triphone.

3. The method according to claim 2, further comprising:

storing a separate acoustic monophone model for each phoneme of the vocabulary, the monophone model for each phoneme being created without regard for any information regarding adjacent phonemes;

receiving an acoustic representation of a target word to be recognized, the acoustic representation including a sequence of codewords each representing an output distribution;

comparing each of the phoneme monophone models with a target codeword of the sequence of codewords of the target word;

computing a monophone probability score for each phoneme monophone model based on the comparing step; and determining which of the phoneme monophone models most closely match the target codeword, the phonemes associated with the most closely matching phoneme monophone models being best matching phonemes.

4. The method according to claim 3, further comprising:

comparing the target codeword of the target word with corresponding the senones of senone trees of the best matching phonemes; and computing a triphone probability score for each best matching phoneme based on the step of comparing the codeword with corresponding senones.

5. The method according to claim 4, further comprising:

updating a word probability score for each word in the vocabulary by using the monophone probability score for the central phoneme of a triphone if the central phoneme is not one of the best matching phonemes and using the triphone probability score for the central phoneme if the central phoneme is one of the best matching phonemes;

repeating the updating step for each codeword of the target word sequence of codewords;

selecting as a best matching word, the vocabulary word having the highest word probability score; and outputting the best matching word.

6. The method according to claim 1 wherein the creating a senone tree step includes forming a composite question for the root node from a plurality of linguistic questions.

7. The method according to claim 6 wherein the forming a composite question step includes:

combining the leaf nodes of the senone tree into two clusters;

selecting one of the two clusters;

determining paths in the senone tree from the selected node to the leaf nodes of the selected cluster;

conjoining the questions for each path from the root node to the selected cluster; and disjoining the conjoined questions.

8. The method according to claim 1 wherein each node has an entropy that reflects the randomness of the output distributions of the node and wherein the step of dividing each node into a plurality of nodes includes:

calculating an entropy reduction value for each linguistic question of a set of linguistic questions, the entropy reduction value reflecting how much the linguistic question reduces the entropy of the output distributions of the node;

determining which of the linguistic questions produces the largest entropy reduction value; and dividing the node into a plurality of nodes based on the linguistic question determined to produce the largest entropy reduction value.

9. The method according to claim 8 wherein the step of calculating an entropy reduction value for each linguistic question includes:

calculating a weighted state entropy reduction value for each state of the selected phoneme; and summing the weighted state entropy reduction values to obtain the entropy reduction value for the selected state.

10. A computer-implemented method of performing speech recognition for a vocabulary of words characterized by one or more phonemes for each word, comprising:

receiving a data set of output distributions based on a set of training words spoken by training users, each output distribution being associated with one of a predetermined number of states of a phoneme of one of the training words; and creating a separate senone tree for each state of each phoneme of the training words, each senone tree having a root node and a plurality of leaf nodes, the creating step including:

selecting successively each one of the phonemes;

selecting successively each one of the states of the selected phoneme;

grouping together in the root node of the senone tree of the selected state all received output distributions associated with the selected state; and distinguishing the leaf nodes from each other according to linguistic questions regarding phonemes adjacent the selected phoneme in one or more training words such that each leaf node represents one or more of the output distributions grouped in the root node.

11. The method according to claim 10 wherein each leaf node of each senone tree represents a plurality of output distributions, the method further comprising creating a senone for each leaf node by combining the output distributions for the leaf node.

12. The method according to claim 11, further including:

receiving an acoustic representation of a target word to be recognized, the acoustic representation including a sequence of codewords each representing an output distribution;

creating a triphone model for each of a plurality of triphones by traversing the senone trees corresponding to states of the central phonemes of the plurality of triphones, the traversing step identifying a senone for each state of each central phoneme of the plurality of triphones;

comparing the codewords of the target word with corresponding senones of the plurality of triphone models; and identifying the triphone model whose senones most closely match the codewords of the target word.

13. The method according to claim 11, further comprising:

storing a separate acoustic monophone model for each phoneme of the vocabulary, the monophone model for a phoneme being created without regard for any information regarding other phonemes;

receiving an acoustic representation of a target word to be recognized, the acoustic representation including a sequence of codewords each representing an output distribution;

comparing each of the phoneme monophone models with the acoustic representation of the target word;

computing a monophone probability score for each phoneme monophone model based on the comparing step; and determining which of the phoneme monophone models most closely matches the acoustic representations of the target word, the phonemes associated with the most closely matching phoneme monophone models being identified as being most closely matching phonemes.

14. The method according to claim 13, further comprising:

traversing the senone trees created for the states of each of the most closely matching phonemes, the traversing step identifying a senone for each state of the most closely matching phoneme;

comparing the codewords of the target word with corresponding senones of the senone trees of the most closely matching phoneme; and computing a triphone probability score for each of the most closely matching phonemes based on the step of comparing the codewords with corresponding senones.

15. The method according to claim 14, further comprising:

computing a word probability score for each of a plurality of words in the vocabulary by using the monophone probability score for each phoneme of the word if the phoneme is not one of the best matching phonemes and the triphone probability score for the phoneme if the phoneme is one of the best matching phonemes;

selecting, as a best matching word, the training word having the highest word probability score; and outputting the best matching word.

16. The method according to claim 10 wherein the distinguishing step includes distinguishing the leaf nodes from each other according to linguistic questions regarding either a phoneme immediately preceding the selected phoneme or a phoneme immediately following the selected phoneme.

17. A computer-implemented method of performing speech recognition using a vocabulary of words having one or more phonemes for each word, comprising:

receiving a data set of output distributions based on a set of training words spoken by training users, each output distribution being associated with one of a predetermined number of states of a phoneme of one of the training words; and creating a separate senone tree for each state of each phoneme of the training words, each senone tree having a plurality of nodes including leaf nodes and non-leaf nodes, the non-leaf nodes including a root node, each non-leaf node corresponding to a linguistic question regarding phoneme context of the phoneme and having branches that correspond to answers to the linguistic question, each leaf node indicating a senone representing output distributions corresponding to the answers represented by the branches taken from the root node to the leaf node.

18. The method according to claim 17 wherein each leaf node of each senone tree represents a plurality of output distributions, the method further comprising:

creating a senone for each leaf node by combining the output distributions for the leaf node;

creating a triphone model for each of a plurality of triphones by traversing the senone trees corresponding to states of the central phonemes of the plurality of triphones, the traversing step identifying a senone for each state of each central phoneme of the plurality of triphones;

receiving an acoustic representation of a target word to be recognized, the acoustic representation including a sequence of codewords each representing an output distribution;

comparing the codewords of the target word with corresponding senones of the plurality of triphone models; and identifying the triphone model whose senones most closely match the codewords of the target word.

19. The method according to claim 17 wherein each leaf node of each senone tree represents a plurality of output distributions, the method further comprising:

creating a senone for each leaf node by combining the output distributions for the leaf node;

storing a separate acoustic monophone model for each phoneme of the vocabulary, the monophone model for a phoneme being created without regard for any information regarding other phonemes;

receiving an acoustic representation of a target word to be recognized, the acoustic representation including a sequence of codewords each representing an output distribution;

comparing each of the phoneme monophone models with the acoustic representation of the target word;

computing a monophone probability score for each phoneme monophone model based on the comparing step; and determining which of the phoneme monophone models most closely matches the acoustic representations of the target word, the phonemes associated with the most closely matching phoneme monophone models being identified as being most closely matching phonemes.

20. The method according to claim 17 wherein the creating step includes creating a selected senone tree for a selected state of a selected phoneme, each non-leaf node of the selected senone tree corresponding to a linguistic question regarding either a phoneme immediately preceding the selected phoneme or a phoneme immediately following the selected phoneme.

21. A computer system for performing speech recognition using a vocabulary of words having one or more phonemes for each word, comprising:

means for receiving a data set of output distributions based on a set of training words spoken by training users, each output distribution being associated with one of a predetermined number of states of a phoneme of one of the training words; and a trainer that creates a separate senone tree for each state of each phoneme of the training words, each senone tree having a plurality of nodes including leaf nodes and non-leaf nodes, the non-leaf nodes including a root node, each non-leaf node corresponding to a linguistic question regarding phoneme context of the phoneme and having branches that correspond to answers to the linguistic question, each leaf node indicating a senone representing output distributions corresponding to the answers represented by the branches taken from the root node to the leaf node.

22. The computer system of claim 21 wherein the trainer creates a senone for each leaf node by combining the output distributions for the leaf node and creates a triphone model for each of a plurality of triphones by traversing the senone trees corresponding to states of the central phonemes of the plurality of triphones, the trainer identifying a senone for each state of each central phoneme of the plurality of triphones based on the traversal, the system further comprising:

means for receiving an acoustic representation of a target word to be recognized, the acoustic representation including a sequence of codewords each representing an output distribution;

a recognizer that compares the codewords of the target word with corresponding senones of the plurality of triphone models and identifies the triphone model whose senones most closely match the codewords of the target word.

23. The computer system of claim 21 wherein the trainer is structured to create a selected senone tree for a selected state of a selected phoneme, each non-leaf node of the selected senone tree corresponding to a linguistic question regarding either a phoneme immediately preceding the selected phoneme or a phoneme immediately following the selected phoneme.

24. A computer-readable storage medium including a data structure for use in speech recognition based on a vocabulary of words having one or more triphones for each word, each triphone including a central phoneme and phonemes positioned immediately adjacent the central phoneme, the data structure including a plurality of senone trees representing a data set of output distributions of training words spoken by training users, each output distribution being associated with one of a predetermined number of states of a triphone central phoneme of one of the training words, the plurality of senone trees including a separate senone tree for each state of each phoneme of the training words, each senone tree having a plurality of nodes including leaf nodes and non-leaf nodes, the non-leaf nodes including a root node, each non-leaf node corresponding to a linguistic question regarding phoneme context of the phoneme and having branches that correspond to answers to the linguistic question, each leaf node indicating a senone representing output distributions corresponding to the answers represented by the branches taken from the root node to the leaf node.

25. The storage medium of claim 24, further including:
a triphone model for each triphone encountered in the training words, each triphone model including a senonic mapping that includes a senone for each state of the central phoneme of the triphone, the senones of the senonic mapping being obtained by traversing the senone trees for the central phoneme of the triphone, the triphone models being structured to enable a computer to recognize a spoken target word using the triphone models.

26. The storage medium of claim 24 wherein a selected non-leaf node of a selected one of the senone trees for a selected phoneme corresponds to a linguistic question regarding either a phoneme immediately preceding the selected phoneme or a phoneme immediately following the selected phoneme.

27. A computer-readable storage medium including executable computer instructions for causing a computer to perform speech recognition, the storage medium comprising:

a plurality of senone trees created using a data set of output distributions based on a set of training words spoken by training users, each training word including one or more phonemes, each phoneme including a predetermined plural number of states, the plurality of senone trees including a separate senone tree for each state of each phoneme of the training words, each senone tree having a plurality of leaf nodes, each leaf node indicating a senone representing one or more output distributions of the data set;

computer instructions for causing the computer to detect an unseen triphone in a target word received by the computer, the unseen triphone being a triphone not encountered in one of the training words and including a central phoneme and left and right phonemes positioned immediately adjacent the central phoneme;

computer instructions for causing the computer to traverse the senone trees for the central phoneme of the unseen triphone and thereby obtain a senone for each state of the central phoneme; and computer instructions for causing the computer to use the senones obtained for the central phoneme to create a triphone model for the unseen triphone, such that the triphone model can be used for future recognition of spoken words that include the unseen triphone.

28. The storage medium of claim 27 wherein each training word has one or more triphones each including a central phoneme and phonemes positioned immediately adjacent the central phoneme, each senone tree having a plurality of nodes including the leaf nodes and non-leaf nodes, the non-leaf nodes including a root node, each non-leaf node corresponding to a linguistic question regarding phoneme context of the phoneme and having branches that correspond to answers to the linguistic question, the senone for each leaf node representing output distributions corresponding to the answers represented by the branches taken from the root node to the leaf node.

29. The storage medium of claim 28 wherein the computer instructions for causing the computer to traverse the senone trees including computer instructions for causing the computer to traverse each senone tree by determining answers to the linguistic questions corresponding to non-leaf nodes of the senone tree based on the left and right phonemes of the unseen triphone and wherein the triphone model for the unseen triphone includes a sequence of the senones obtained by traversing the senone trees corresponding to the central phoneme of the unseen triphone.

30. The storage medium of claim 27, further including:
a set of phoneme monophone models, each monophone model representing a phoneme of the vocabulary without regard for any contextual information concerning phonemes adjacent the phoneme in any of the words of the vocabulary;

computer instructions for causing the computer to receive an acoustic representation of the target word;

computer instructions for causing the computer to compare the acoustic representation of the target word with each of the monophone models and determine a subset of the set of monophone models by determining which of the monophone models most closely match the acoustic representation, the phonemes corresponding to the monophone models in the subset being best matching phonemes;

computer instructions for causing the computer to compare the acoustic representation only with the triphone models that represent the best matching phonemes;

computer instructions for causing the computer to update a word probability score for each word in the vocabulary, the word probability scores for words that include one of the best matching phonemes being updated based on the comparison of the acoustic representation with triphone models, and the word probability scores for words that do not include one of the best matching phonemes being updated based on the comparison of the acoustic representation with the monophone models; and computer instructions for causing the computer to select, as a best matching word, the vocabulary word with the best word probability score.

* * * * *